United States Patent [19]

Richardson

[11] Patent Number: 4,459,899

[45] Date of Patent: Jul. 17, 1984

[54] SINGLE ACTING RECIPROCATING PUMP PISTON

[76] Inventor: Murl R. Richardson, 8112 Bangor, Fort Worth, Tex. 76116

[21] Appl. No.: 363,067

[22] Filed: Mar. 29, 1982

Related U.S. Application Data

[63] Continuation of Ser. No. 138,458, Apr. 8, 1980, abandoned.

[51] Int. Cl.$^3$ .............................................. F01B 31/10
[52] U.S. Cl. ........................................ 92/159; 92/249
[58] Field of Search ................ 92/159, 158, 160, 86.5, 92/153, 248, 249

[56] References Cited

U.S. PATENT DOCUMENTS

| | | | |
|---|---|---|---|
| 1,687,878 | 10/1928 | Moorhouse | 92/160 |
| 1,877,530 | 9/1932 | Read | 92/158 |
| 4,086,844 | 5/1978 | Homuth | 92/159 |
| 4,157,057 | 6/1979 | Bailey | 92/86.5 |

FOREIGN PATENT DOCUMENTS 752329  7/1956  United Kingdom ................. 92/158

Primary Examiner—Paul E. Maslousky

[57] ABSTRACT

A pump piston assembly for a single acting reciprocating pump used in slush pumps handling liquids and semi-liquids carrying abrasives and other solid matter for the circulation of drilling fluid or slush in oil well drilling operations. A cast iron (or forged steel) piston element, having a hub extension for the mounting of an annular piston seal, is provided with a through opening for mounting of the piston assembly on the end of a piston rod. The large diameter metal base of the piston element is provided with a multi-channeled, or grooved, peripheral surface and an annular beveled edge at the piston rear face for the optimal flow of fluid into the piston peripheral surface during back strokes of the piston assembly for optimal fluid lubrication of the piston element within the pump cylinder lining. An annular fluid reservoir groove is also provided in the metal base for optimized retention of fluid for the multi-channeled peripheral surface with some embodiments.

9 Claims, 4 Drawing Figures

U.S. Patent    Jul. 17, 1984    4,459,899
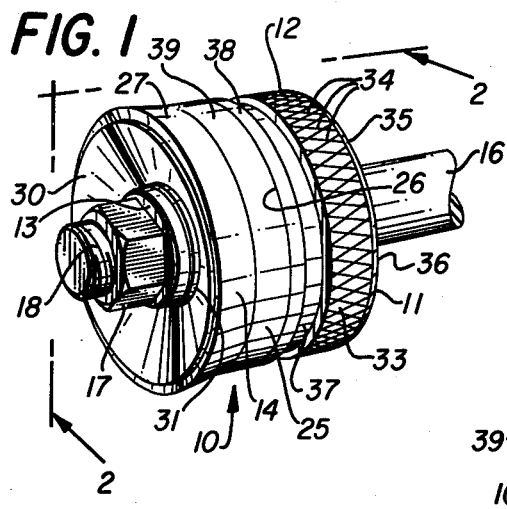
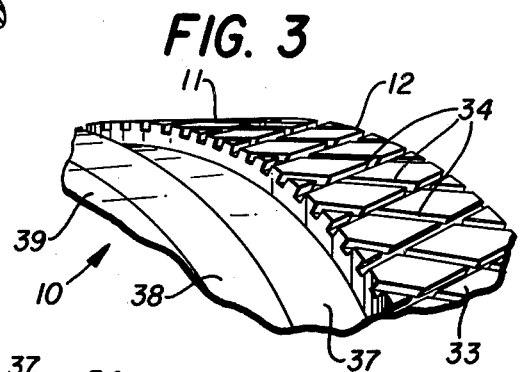
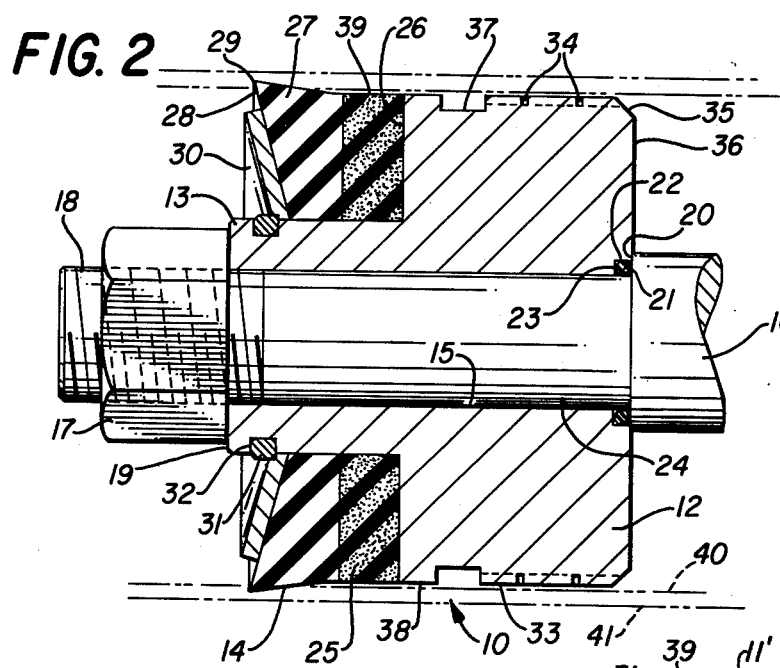
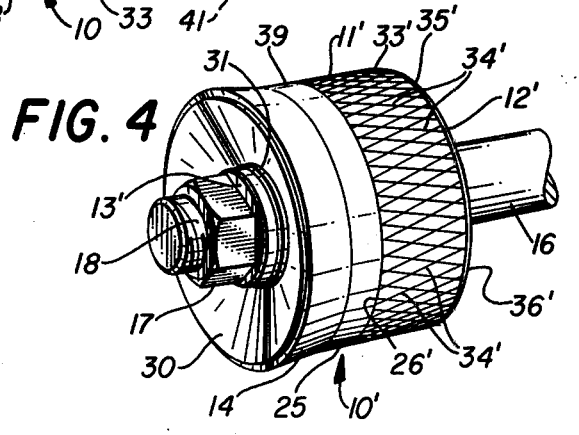

SINGLE ACTING RECIPROCATING PUMP PISTON

This is a continuation of application Ser. No. 138,458, filed Mar. 8, 1980, now abandoned.

This invention relates in general to pump piston assemblies and, in particular, to a single acting reciprocating pump piston assembly with a metal piston element having a hub extension mounting an annular piston seal and a through opening for mounting on a piston rod, and with a large diameter metal base having a multi-channeled peripheral surface and a rear face beveled edge for flow supply feeding of fluid to the peripheral surface for optimal fluid lubrication of the piston element within a pump cylinder.

Heavy duty operation of slush pumps in pumping drilling mud, slush, or water, presents wear and service problems from inadequate piston lubrication, with optimized service life of great importance. In oil well drilling operations it is particularly important that maintenance requirements and/or piston replacement time be minimized since loss of drilling time while mud pumps are shut down for piston replacement or servicing represents a substantial cost factor in oil well development. Further, heretofore many mud pump rubber-like seal elements during pumping have had a tendency to go through repeated compression and release cycles with compression of seal element body portions aiding in sealing contact with a pump cylinder liner wall but with wear intensified when piston to cylinder wall lubrication is inadequate. These repeated compression and release cycles imposed on the seal elements have, in many instances, particularly with friction binding, resulted in working wear of piston seals and the piston elements backing the seal, with it important that, as best possible, flexing stresses imposed on piston seals not be intensified by excess seal to cylinder lining binding.

It is, therefore, a principal object of this invention to provide a heavy duty piston assembly having long wear life and minimal maintenance requirements.

Another object is to provide a piston assembly with optimized piston seal and piston element to cylinder wall lubrication.

A further object with such a piston assembly is to optimize retention of lubricating fluid in the piston element to cylinder contact area for prolonged wear life.

Features of this invention useful in accomplishing the above objects include, in a single acting reciprocating pump, a metal piston element having a through opening for mounting of the piston assembly on the end of a piston rod, a large diameter metal piston base, and a hub extension from the piston base mounting an annular piston seal. The large diameter metal piston base includes a multi-channeled, or grooved peripheral surface and an annular beveled edge at the piston rear face for optimal flow of fluid to the piston peripheral surface during back strokes of the piston assembly. An annular fluid reservoir groove is also included in the peripheral surface of the metal piston base of some units to optimize retention of fluid for the multi-channeled peripheral surface during pumping operation.

A specific embodiment representing what is presently regarded as the best mode of carrying out the invention is illustrated in the accompanying drawing:

In the drawing:

FIG. 1 represents a perspective view of the new improved single acting reciprocating pump piston element mounted on a piston rod;

FIG. 2, a cutaway and sectioned view of a piston assembly mounted on a piston rod taken from line 2—2 of FIG. 1;

FIG. 3, a partial enlarged perspective view of the piston of FIGS. 1 and 2 showing detail of multi-channeled, or grooved, peripheral surface and annular fluid reservoir groove of the metal piston base; and FIG. 4, a perspective view of another single acting reciprocating pump piston mounted on a piston rod with a multi-channeled, or grooved, peripheral surfaced metal piston base not including an annular fluid reservoir groove.

Referring to the drawing:

The piston assembly 10, as shown in FIGS. 1, 2 and 3, includes a single acting reciprocating piston element 11 having a large diameter metal piston base 12 and a hub extension 13 mounting an annular piston seal 14 is provided with a through opening 15 for mounting of the piston element on the end of a piston rod 16. The piston assembly 10 is tightened in place on rod 16 by piston retaining nut 17 tightened on piston rod threaded end 18 with the nut in restraining abutment with hub end 19 and the piston base 12 tightened against shoulder 20 of piston rod 16. An "O" ring seal 21 is enclosed within an enlarged end bore 22 of opening 15, bore shoulder 23, the piston mounting shank 24 of rod 16 and the shoulder 20 of the rod 16. The annular piston seal 14 is a compound seal with a relatively non-compressive, non-flexible fabric base portion 25, in base supporting contact with seal face 26 of the metal piston base 12, and rubber-like flexible body 27 having a slanted face 28 and a slightly outwardly extended lip 29. The seal 14 with the fabric base portion 25 and the rubber-like flexible body 27 are bonded together as by being vulcanized together with the fabric base portion 25 impregnated with rubber-like material similar to the rubber-like material of body 27. In any event, piston seal 14 is held in place on hub extension 13 by an annular beveled washer 30 retained by retaining ring 31 in hub groove 32.

The large diameter metal piston base 12 of piston element 11 is provided with a peripheral surface 33 that is multi-channeled with a great number of criss-cross directed grooves 34 extending from an annular beveled edge 35 at the piston rear face 36 to an annular fluid reservoir groove 37. The reservoir groove 37 is shown to be deeper than grooves 34 and of such width as to present material storage volume for fluid directed thereto through grooves 34. Piston base 12 of element 11 is shown to also have a peripheral outer surface portion 38 between reservoir groove 37 and seal face 26 of base 12. The peripheral surface 33, surface portion 38 and the outer surface 39 of fabric base portion 25 are of substantially the same diameter and sized to be a reciprocating sliding fit within the bore 40 of a cylinder liner 41 and with the lip 29 of seal 14 in sliding sealing engagement with the wall of bore 40 on positive pump strokes. The criss-cross directed grooves 34 as multi-channeling in piston peripheral surface 33 are effective in helping retain lubricating fluid at the surface, with an interacting turbulence of fluid resisting outflow of fluid in passage through groove 34 intersections. This interacting turbulance at the uniformly distributed groove intersections also helps force fluid up to between the surface 33 and liner bore 40 for proper optimized piston to bore lubrication in the reciprocating pump action. It should be noted that a piston assembly such as shown in FIGS. 1 and 2 could be provided that does not include an annular beveled edge 35 at the piston rear face 36. However, with such structure flow of fluid from the rear of the piston to the groove 34 and peripheral surface 33 would not be optimized to the degree of optimal feeding of lubricating fluid as attained during back strokes of the piston assembly including an annular beveled edge 35.

The piston assembly 10' embodiment of FIG. 4 is very much the same as the piston assembly 10 of FIGS. 1 and 2 with, however, no annular fluid reservoir groove such as the groove 37 provided and no smooth surface portion such as surface portion 38 provided. While this piston is shown to have an annular beveled edge 35', it may also be made without an annular beveled edge, but here again with, as a result, less optimal feed flow of lubricating fluid to the grooves 34' and piston peripheral surface 33'. Portions of this embodiment the same as with FIGS. 1 and 2 are numbered the same and those similar with some change are identified with primed numbers without functional operation being unnecessarily repeated again for the embodiment of FIG. 4.

Thus, there are hereby provided single acting pump pistons in several variations having flow supply feeding of fluid to a piston peripheral surface for optimal fluid lubrication of the piston within a pump cylinder to optimize piston assembly and pump cylinder wear life and provide pump systems for heavy duty with minimal maintenance required.

Whereas this invention is herein illustrated and described with respect to specific embodiments thereof, it should be realized that various changes may be made without departing from essential contributions to the art made by the teachings hereof.

I claim:

1. A piston assembly for use in a cylinder liner of a single acting reciprocating pump utilizing a fluid medium behind the piston assembly as a piston assembly lubricant; said piston assembly includes a rigid piston element having a center opening for mounting of the piston element on a piston rod, a radially outwardly extended annular piston base having a rear face in communication with said fluid behind the piston assembly and a hub extension from the piston base for mounting an annular piston seal with a resiliently flexible material annular seal lip; a peripheral surface means on said piston base sized to be a sliding fit within the cylinder liner of said reciprocating pump; a plurality of grooves in said peripheral surface means in fluid communiction with the fluid at the rear face of said piston element for optimal flow of fluid to the piston peripheral surface during back strokes of the piston assembly; and, wherein an annular beveled edge is provided at the piston rear face in fluid communication with said grooves as an aid to optimal flow of fluid to the piston peripheral surface during back strokes of the piston assembly.

2. The piston assembly of claim 1, wherein an annular fluid reservoir groove is provided in said peripheral surface means in fluid communication with said plurality of grooves.

3. The piston assembly of claim 2, wherein said plurality of grooves extend through said peripheral surface means from said annular beveled edge to said annular fluid reservoir groove.

4. The piston assembly of claim 3, wherein said plurality of grooves are criss-crossed with a plurality of groove channel interconnections in said peripheral surface means.

5. The piston assembly of claim 3, wherein said rigid piston element has a seal backing forward face, and a peripheral outer surface portion extended longitudinally from said annular fluid reservoir groove to said seal backing forward face.

6. The piston assembly of claim 1, wherein an annular fluid reservoir groove is provided in said peripheral surface means in fluid communication with said plurality of grooves.

7. The piston assembly of claim 6, wherin said plurality of grooves extend through said peripheral surface means from said rear face of said piston element to said annular fluid reservoir groove.

8. The piston assembly of claim 7, wherein said plurality of grooves are criss-crossed with a plurality of groove channel interconnections in said peripheral surface means.

9. The piston assembly of claim 7, wherein said rigid piston element has a seal backing forward face, and a peripheral outer surface portion extended longitudinally from said annular fluid reservoir groove to said seal backing forward face.

* * * * *